United States Patent
Yang et al.

(10) Patent No.: US 6,425,091 B1
(45) Date of Patent: Jul. 23, 2002

(54) METHOD AND APPARATUS FOR TOLERATING SCHEDULING LATENCY AND ACHIEVING TIME ALIGNMENT FOR TRANSMIT AND RECEIVE SIGNALS IN HIGH-SPEED MODEMS IMPLEMENTED ON HOST PROCESSORS

(75) Inventors: Jian Yang, Mansfield; Venkatraman Gopal Krishnan, Shrewsbury, both of MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/243,745

(22) Filed: Feb. 3, 1999

(51) Int. Cl.[7] ................................................. G06F 1/04
(52) U.S. Cl. ....................................................... 713/600
(58) Field of Search ................................. 713/400, 401, 713/500, 501, 502, 503, 600

(56) References Cited

U.S. PATENT DOCUMENTS 4,868,850 A * 9/1989 Kaku et al. ................. 375/231
5,261,099 A * 11/1993 Bigo et al. .................. 709/102
5,384,780 A    1/1995 Lomp et al.
5,799,064 A    8/1998 Sridhar et al.
5,822,540 A * 10/1998 Caldara et al. ............. 709/236

FOREIGN PATENT DOCUMENTS

EP        0762655 A2 * 12/1997    ............ H03M/1/00

* cited by examiner

Primary Examiner—Dennis M. Butler

(57) ABSTRACT

The preferred embodiment of the present invention provides a method and apparatus for dealing with scheduling latency in high-speed modems (100) implemented on host processors (101). With the present invention, high scheduling latency of the host operating system (135) is tolerated without incurring large end-to-end transmission delay. In addition, time alignment between downstream and upstream signals (175, 180) is achieved even though the scheduling delay may be large and varying.

20 Claims, 2 Drawing Sheets

METHOD AND APPARATUS FOR TOLERATING SCHEDULING LATENCY AND ACHIEVING TIME ALIGNMENT FOR TRANSMIT AND RECEIVE SIGNALS IN HIGH-SPEED MODEMS IMPLEMENTED ON HOST PROCESSORS

FIELD OF THE INVENTION

The present invention relates generally to a method and apparatus for tolerating scheduling latency and achieving time alignment for transmit and receive signals in high-speed modems implemented on host processors.

BACKGROUND OF THE INVENTION

With host processors in personal computers becoming more and more powerful, it becomes feasible to implement high-speed modems such as asymmetrical digital subscriber line (ADSL) modems in software. Computation complexity or millions-of-instructions-per-second, however, are not the only challenges for a successful implementation of high-speed modems. The digital signal processor (DSP) functions for the high-speed modems require real-time execution, e.g., the DSP function must be executed to generate additional transmit samples to be queued to the transmit (TX) buffer before it becomes empty and the DSP function must be executed to process received samples before the receive (RX) buffer becomes full. The host processor, however, may be running many other tasks concurrently such that its operating system may not be able to guarantee the timely execution of the real-time DSP functions. In other words, the scheduling latency, as defined as the delay of actual execution of the task from the time when the request is generated, is very large. Clearly, if the latency exceeds the amount of time it takes to transmit the remaining samples in the TX buffer, a TX buffer underrun problem will arise. Likewise, if the RX task does not get executed by the time the RX buffer is completely filled, a RX buffer overrun problem will arise.

In addition, the large response time may cause problems for meeting certain requirements. For example, the ADSL standards (G.992.x) require time alignment between upstream and downstream signals, i.e., certain upstream signal must appear at the line at about the same time its corresponding downstream signal is being transmitted by the central site modem. The straightforward approach of starting to send the upstream signal as soon as the corresponding downstream signal is received would fail if the response delay is large.

Thus, there exists a need to provide a method and apparatus that deals with the large response delay caused from the transmit buffer underrun and/or receive buffer overrun, and also resolves its corresponding time alignment problems.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

The preferred embodiment of the present invention provides a method and apparatus for dealing with scheduling latency in high-speed modems implemented on host processors. With the present invention, high scheduling latency of the host operating system (OS) is tolerated without incurring large end-to-end transmission delay. In addition, time alignment between downstream and upstream signals is achieved even though the scheduling delay may be large and varying.

Figure 1:
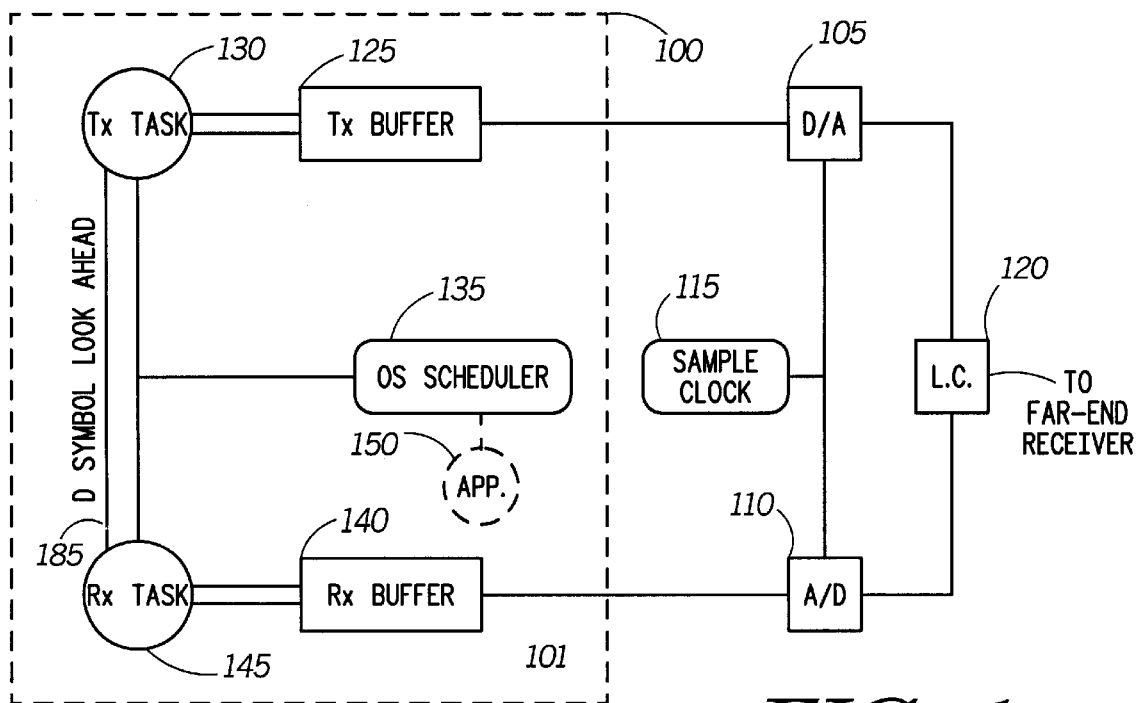
FIG. 1 illustrates a block diagram of a host processor based ADSL modem according to the preferred embodiment of the present invention.

FIG. 1 illustrates a conceptual block diagram of a high-speed modem 100 implemented on a host processor 101 according to the preferred embodiment of the present invention. The hardware components of the modem 100 consist of a digital-to-analog (D/A) converter 105 and an analog-to-digital (A/D) converter 110, which are driven by a sample clock 115 generator, and a line coupler 120, which typically consists of analog filters, amplifiers and a hybrid. The software components of the modem 100 consist of a TX buffer 125, a TX DSP task 130, a host operating system (OS) task scheduler 135, a RX buffer 140 and a RX DSP task 145.

The TX buffer 125 stores transmit data samples generated by the TX DSP task 130 before the data samples are sent to the D/A converter 105.

The RX buffer 140 stores the A/D converter 110 data samples to be processed by the RX DSP task 145. Both the TX and RX buffers 125, 140 are implemented in the host processor's memory. The TX and RX DSP asks 130, 145 are executed by the host processor 101 and are scheduled by he host OS task scheduler 135.

A request is generated to the host OS task scheduler 135, typically in the form of an interrupt, either periodically or when the number of samples in the TX buffer 125 is below a threshold for an execution of the TX DSP task 130. Similarly, a request for the RX task 145 is generated either periodically or when the number of samples in the RX buffer 140 is above a threshold.

In a host processor environment, although the worst case scheduling latency can be very large, the typical case is usually one or two orders of magnitude smaller. The preferred embodiment of the present invention utilizes this fact to reduce the impact of the scheduling latency.

Figure 2:
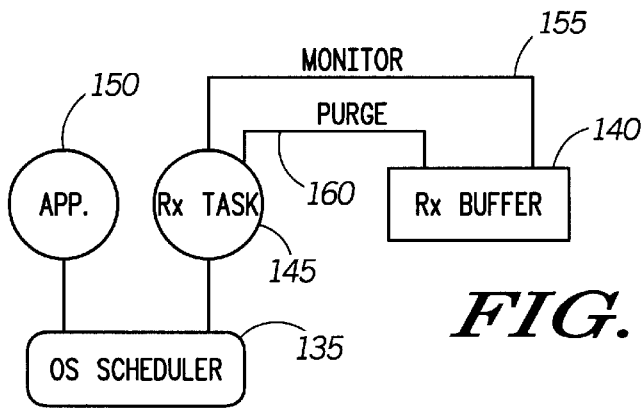
FIG. 2 illustrates a block diagram of a receive buffer overrun prevention technique according to the preferred embodiment of the present invention.

The RX buffer 140 overrun problem is minimized by keeping the RX buffer 140 large. Preferably, the RX buffer 140 is large enough to handle worst-case interrupt latency other than unusual cases when the RX DSP task 145 is significantly delayed. As shown in FIG. 2, each time the RX DSP task 145 is executed it processes the entire RX buffer 140 and delivers decoded data to an upper layer application 150. Since the upper layer application 150 that uses the received decoded data typically has a lower scheduling priority than the RX DSP task 145, the RX DSP task 145 scheduling latency does not substantially increase the delay as seen by the upper layer application 150 as long as the amount of time it takes to complete the RX DSP task 145 is not excessive. The RX DSP task 145 can only be blocked by a higher priority level task that would also block the execution of the upper layer application 150.

In the unusual case when the RX DSP task 145 is significantly delayed, the amount of samples in the RX buffer 140 may become excessive to process. In the preferred embodiment of the present invention, the number of samples in the RX buffer 140 is monitored 155. If the number of samples exceeds a certain threshold at the time the RX DSP task 145 is executed, some of the samples in the RX buffer 140 are discarded/purged to reduce the amount of processing needed 160. Discarding some of the samples may cause a glitch in the received data stream. In most cases, however, such an infrequent glitch is smoothed out by a higher layer re-transmission protocol or is ignored.

Figure 3:
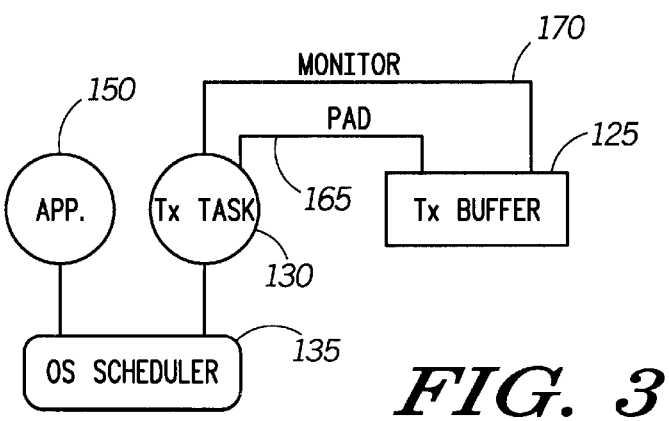
FIG. 3 illustrates a block diagram of transmit buffer handling according to the preferred embodiment of the present invention.

With respect to the TX buffer 125 underrun problem, it is undesirable to keep a lot of samples in the TX buffer 125, as it increases the end-to-end transmission delay. In the preferred embodiment of the present invention, it is not desirable to avoid the TX buffer underrun completely. As shown in FIG. 3, each time the TX DSP task 130 is executed it only generates enough TX data samples such that the number of data samples in the TX buffer 125 reaches a certain threshold. When the TX buffer 125 is full, the TX DSP task 130 is not delayed.

In addition, pad samples 165 are appended to the end of the TX buffer 125. Pad samples 165 are patterns that are least destructive to the far-end-receiver (e.g., for ADSL, this could be a synchronization symbol). As a result, the TX buffer underrun results in the pad samples 165 being sent, which merely causes a recoverable glitch in the far-end-receiver (not shown). The TX buffer threshold is designed such that TX buffer underrun does not occur for typical scheduling delays, i.e., TX buffer underrun does not occur often.

Clearly, it is critical to set the TX buffer threshold to best balance the delay and the occurrence of the glitch. As such, the preferred embodiment of the present invention adaptively adjusts the threshold setting based on the host processor's speed and loading. In order to adaptively adjust the threshold setting based on the host processor's speed and loading, the depth of the TX buffer 125 is monitored 170 each time the TX DSP task 130 is executed. Every time a TX DSP task 130 is executed, the number of data samples stored in the TX buffer 125 is recorded. The depth of the TX buffer 125 is used as metrics for TX buffer threshold adjustments. Several algorithms can be used to accomplish the TX buffer threshold adjustments. The basic idea of the algorithms is to increase the thresholds when the depth of the TX buffer 125 is too small and vice versa. As an example, a user can record the number of TX buffer underruns during a time interval of ten (10) seconds. If the number of TX buffer underruns exceeds a predetermined value or is above a specific design goal (e.g., the user only wants an underrun to occur three (3) times during the ten (10) second time interval), the TX buffer threshold is increased. In order to increase the TX buffer threshold, the TX buffer 125 queues extra data samples from the subsequent executed TX DSP tasks 130.

A further example is to calculate the average of the depth of the TX buffer 125 during a specified time interval (e.g., a one (1) second time interval). If the calculated average is below a specified design goal, the TX buffer threshold is increased.

Figure 4:
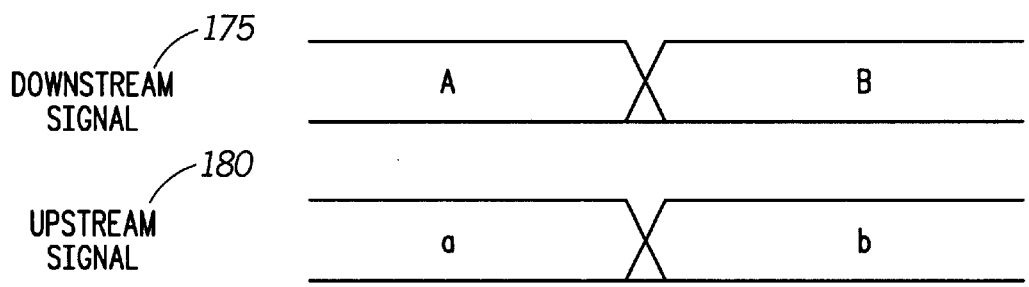
FIG. 4 illustrates a timing diagram of a downstream and upstream signal time alignment according to the preferred embodiment of the present invention.

In addition to buffer underrun/overrun problem, now resolved by the preferred embodiment of the present invention above, scheduling latency also causes difficulty for achieving time alignment between transmit and receive signals as required by ADSL standards. As shown in FIG. 4, there is a state transition in the downstream signal 175 from segment A to segment B and in the upstream signal 180 from segment a to segment b. For example, if using the ADSL standard, segment A could be the C-REVER3 signal defined in G.992.2 and segment B could be the C-SEGUE1 signal, segment a could be the R-REVERB2 signal and segment b could be the R-SEGUE1 signal. Looking from the telephone line, the a/b transition in the upstream signal 180 should occur simultaneously with the A/B transition in the downstream signal 175. Due to the scheduling latency and the relatively large delay in the RX and TX buffers 125, 140, it is not feasible for the client modem to start generating TX data samples for segment b upon detecting the A/B transition in the downstream signal 175.

Referring back to FIG. 1, the sample clock 115 is locked between the D/A and A/D converters 105, 110, i.e., the two sample clocks 115 are derived from the same source. In addition, the scheduling of the TX and RX tasks 130, 145 is also locked, i.e., either the TX or RX interrupt is used to schedule both TX and RX DSP tasks 130, 145. As such, the sum of the local transmit delay and the local receive delay (i.e., the local echo path delay) is constant in the sense that it does not vary with the scheduling delay. This is because a delayed interrupt service causes a shortening of transmit delay as the data samples in the TX buffer 125 are being taken to; the D/A converter 105 at the constant sampling rate. This shortening of transmit delay, however, is matched exactly by a lengthening of receive delay as samples from the A/D converter 110 are being fed into the RX buffer 140 at exactly the same rate. It should be noted that the constant local echo path delay is in terms of the product of number of samples and the corresponding sampling interval rather than simply number of samples. There is a need for such a distinction as the TX and RX sampling rates may be different. In particular, for ADSL modems, the constant local echo path delay can be represented in terms of symbols, as the ADSL symbol rate is the same for downstream and upstream.

In addition to locking the local echo path delay, the preferred embodiment of the present invention also drives the TX DSP task 130 based on a "look-ahead" scheme 185. In other words, the preferred embodiment of the present invention anticipates the next transmit state transition and queues the appropriate transmit signal to the TX buffer 125 before the corresponding RX signal is received/processed. In particular, if "D" is the constant sum of delays in symbols, a "D symbol look-ahead" scheme 185 is required. Referring back to the previous example, the TX DSP task 130 starts generating samples for segment b "D" symbols earlier than the A/B transition is detected in the downstream signal 175.

The D symbol look-ahead scheme in conjunction with locking the TX and RX sample clock/processing guarantees the alignment between the downstream and upstream signals 175, 180. To verify this, consider the case when transmit delay is zero and receive delay is "D" symbols. The "D symbol look-ahead" scheme 185 described above clearly ensures the alignment in this particular case. In the more general case, when transmit delay is d>0, receive delay must then be D-d, the TX DSP task 130 queues the first sample of segment b to the TX buffer 125 D - (D-d)=d symbols before the A/B transition occurs at the line. Since the TX delay in this case is d, the a/b transition would occur at the same time as the A/B transition.

In order for the "D symbol look-ahead" scheme 185 to be feasible, the TX DSP task 130 must know what TX samples need to be generated "D" symbols before its corresponding RX signal is processed by the RX DSP task 145. In the example above, the RX DSP task 145 needs to know when the A/B transition in the downstream signal 175 is going to occur "D" symbols before it finishes processing the last symbol of segment A. This is needed for signaling the TX DSP task 130 to complete sending upstream signal segment a and start sending segment b. This problem is dealt with in one of three ways.

Firstly, an earlier state transition in the RX signal is used to predict the next state transition. Sometimes, it is a known fixed number of symbols between the previous state transition and the upcoming state transition. By counting the number of received symbols, the occurrence of the upcoming state transition is accurately predicted. Therefore, the transmit task is informed of which transmit samples need to be generated by using a previous state transition in the receive signal to predict the upcoming state transition, wherein the receive signal has a known fixed number of symbols between the previous state transition and the upcoming state transition, and by counting a number of received symbols, an occurrence of the upcoming state transition is accurately predicted.

Secondly, in some cases the RX DSP task 145 may be able to generate early decisions. An example is the case where the modem 100 needs to start sending segment b upon detecting the presence of signal segment A. In such a case, the RX DSP task 145 needs to be able to detect signal A before observing the last symbol of the signal segment. This is often possible especially if the signal segment A is a tonal signal. Therefore, the transmit task is informed of which transmit samples need to be generated by detecting a certain receive signal; determining a presence of the certain receive signal at least D symbols before the certain receive signal terminates; and sending a response to the certain receive signal upon determining its presence.

Thirdly, in some cases the state transition from A to B is known (can be predicted), but the content of signal b depends on the reception of the signal A. As an example, segment A is used by the modem 100 to estimate certain channel parameters, and the upstream signal 180 sent in segment b depends on the result of the estimation. In such cases, the modem 100 in the present invention does not use the "D" symbols at the end of the segment A for the estimation, i.e., the channel estimation terminates D symbols before the end of the segment A, and the result of the prematurely terminated estimation are used for generating segment b in the upstream signal. Therefore, the transmit task is informed of which transmit samples need to be generated by estimating certain channel parameters; prematurely terminating the step of estimating D symbols before an end of its corresponding receive signal; and using the prematurely terminated estimation for generating the upcoming state transition.

Thus, the preferred embodiment of the present invention achieves time alignment via locking the local echo path delay and driving the transmit state transition based on a "look ahead" scheme. As described above, the sum of the local transmit delay and the local receive delay are fixed even though the interrupt latency varies.

Assuming that "D" is the constant local echo path delay (in unit of symbols). A "D symbol look ahead" scheme is then implemented. In other words, the transmit signal is queued when the receiver is processing the D'th symbol before the corresponding far end signal. Such a configuration ensures that the transmit signal appears at the phone line at the right instant.

Figure 5:
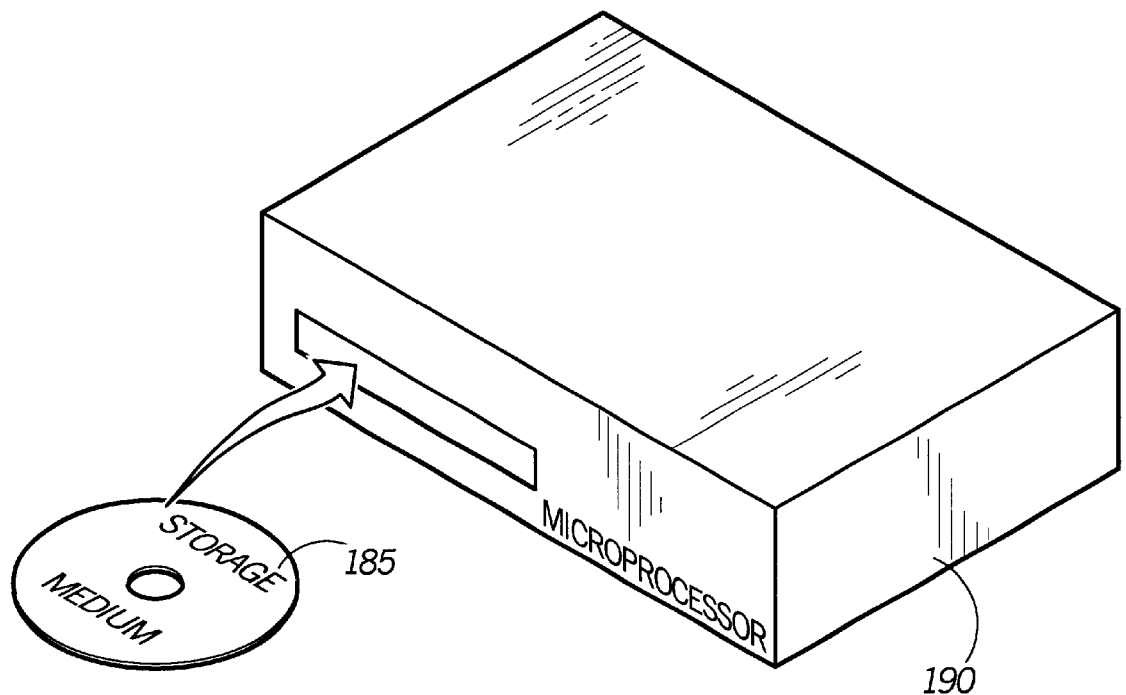
FIG. 5 illustrates a block diagram of a storage medium having stored thereon a set on instructions, which when loaded into a microprocessor, causes the microprocessor to perform a variety of function according to the preferred embodiment of the present invention.

While the invention has been described in conjunction with a specific embodiment thereof, additional advantages and modifications will readily occur to those skilled in the art. For example, as shown in FIG. 5, the preferred embodiment of the present invention can be embodied in a storage medium 185 having stored thereon a set of instructions which, when loaded into a microprocessor 190, causes the microprocessor 190 to perform a variety of functions (some of which are described below), in accordance with the preferred embodiment of the present invention.

The storage medium 185 could have stored thereon a set of instructions that would cause the microprocessor 190 to execute a transmit task; generate data samples such that a number of data samples in a transmit buffer reaches a predefined buffer threshold; append pad samples to an end of the transmit buffer; and transmit the pad samples to a far-end-receiver in an event of a transmit buffer underrun, wherein the transmit buffer underrun occurs when the data samples in the transmit buffer are depleted.

The storage medium 185 could have stored thereon a set of instructions that would also cause the microprocessor 190 to execute a receive task; processing data samples from a receive buffer; monitor the number of data samples in the receive buffer; and if the number of data samples in the receive buffer exceeds a threshold at a time the receive task is executed, purge a portion of the data samples in the receive buffer.

The storage medium 185 could have stored thereon a set of instructions that would cause the microprocessor 190 to transport transmit data samples from a transmit buffer to a digital-to-analog converter at a transmit sampling rate; transport receive data samples from an analog-to-digital converter to a receive buffer at a receive sampling rate; lock a sample clock between the digital-to-analog converter and the analog-to-digital converter such that the digital-to-analog converter and the analog-to-digital converter are derived from a common clock source; and lock a scheduler between a transmit task and a receive task such that a sum of a local transmit delay and a local receive delay is constant.

The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for tolerating scheduling latency in a high-speed modem implemented on a host processor comprising:
   executing a transmit task;
   generating data samples such that a number of data samples in a transmit buffer reaches a predefined buffer threshold;
   appending pad samples to an end of the transmit buffer; and
   sending the pad samples to a far-end-receiver in an event of a transmit buffer underrun, wherein the transmit buffer underrun occurs when the data samples in the transmit buffer are depleted.

2. The method according to claim 1 wherein the predefined buffer threshold is adaptively adjusted based on the host processor's speed and loading.

3. The method according to claim 2 wherein adaptively adjusting the predefined buffer threshold comprises monitoring a depth of the transmit buffer each time the transmit task is executed, wherein a history of depths of the transmit buffer are used as metrics for the predetermined threshold adjustments.

4. The method according to claim 3 wherein the predetermined buffer threshold is increased when the depth of the transmit buffer is too small.

5. The method according to claim 4 wherein the predetermined buffer threshold is increased by having the transmit buffer queue extra data samples from subsequent executed transmit tasks.

6. The method according to claim 3 further comprising:
calculating an average of the depth of the transmit buffer during a specified time interval; and
if the average calculated is below a predetermined value, increasing the predetermined buffer threshold.

7. The method according to claim 3 wherein the predefined buffer threshold is decreased when the depth of the transmit buffer is too large.

8. The method according to claim 7 wherein the predetermined buffer threshold is decreased by having the transmit buffer queue fewer data samples from subsequent executed transmit tasks.

9. A method for achieving time alignment between transmit and receive signals in a high-speed modem implemented on a host processor comprising:
transporting transmit data samples from a transmit buffer to a digital-to-analog converter at a transmit sampling rate;
transporting receive data samples from an analog-to-digital converter to a receive buffer at a receive sampling rate;
locking a sample clock between the digital-to-analog converter and the analog-to-digital converter such that the digital-to-analog converter and the analog-to-digital converter are derived from a common clock source; and
locking a scheduler between a transmit task and a receive task such that a sum of a local transmit delay and a local receive delay is constant.

10. The method according to claim 9 wherein a transmit sampling rate differs from a receive sampling rate.

11. The method according to claim 9 wherein a transmit sampling rate is identical to a receive sampling rate.

12. The method according to claim 9 further comprising:
anticipating an upcoming state transition; and
queuing a transmit signal to a transmit buffer before its corresponding receive signal is processed.

13. The method according to claim 12 wherein the step of anticipating the upcoming state transition comprises informing the transmit task which transmit samples need to be generated D symbols before its corresponding receive signal is processed by the receive task, wherein D is the sum of the local transmit delay and the local receive delay.

14. The method according to claim 13 wherein the transmit task is informed of which transmit samples need to be generated by using a previous state transition in the receive signal to predict the upcoming state transition, wherein the receive signal has a known fixed number of symbols between the previous state transition and the upcoming state transition, and by counting a number of received symbols, an occurrence of the upcoming state transition is accurately predicted.

15. The method according to claim 13 wherein the transmit task is informed of which transmit samples need to be generated by:
estimating certain channel parameters;
prematurely terminating the step of estimating D symbols before an end of its corresponding receive signal; and
using the prematurely terminated estimation for generating the upcoming state transition.

16. The method according to claim 13 wherein the transmit task is informed of which transmit samples need to be generated by:
detecting a certain receive signal;
determining a presence of the certain receive signal at least D symbols before the certain receive signal terminates; and
sending a response to the certain receive signal upon determining its presence.

17. An apparatus for tolerating scheduling latency in high-speed modems implemented on host processors comprising, in hardware:
a digital-to-analog converter;
an analog-to-digital converter;
a sample clock locked between the digital-to-analog converter and the analog-to-digital converter in order to operate the digital-to-analog converter and the analog-to-digital converter from a common clock source; and
a line coupler, coupled tot he digital-to-analog converter and to the analog-to-digital converter.

18. The apparatus according to claim 17 further comprising, in software:
a transmit buffer, coupled to the digital to analog converter;
a transmit task, coupled to the transmit buffer;
a receive buffer coupled to the analog-to-digital converter;
a receive task, coupled to the receive buffer; and
a host operating system scheduler, coupled to the transmit task and the receive task in order to lock any scheduling of the transmit task and the receive task.

19. A storage medium having stored thereon a set of instructions which, when loaded into a microprocessor, causes the microprocessor to perform the following functions:
executing a transmit task;
generating data samples such that a number of data samples in a transmit buffer reaches a predefined buffer threshold; and
appending pad samples to an end of the transmit buffer; and sending the pad samples to a far-end-receiver in an event of a transmit buffer underrun, wherein the transmit buffer underrun occurs when the data samples in the transmit buffer are depleted.

20. A storage medium having stored thereon a set of instructions which, when loaded into a microprocessor, causes the microprocessor to perform the following functions:
transporting transmit data samples from a transmit buffer to a digital-to-analog converter at a transmit sampling rate;
transporting receive data samples from an analog-to-digital converter to a receive buffer at a receive sampling rate;
locking a sample clock between the digital-to-analog converter and the analog-to-digital converter such that the digital-to-analog converter and the analog-to-digital converter are derived from a common clock source; and
locking a scheduler between a transmit task and a receive task such that a sum of a local transmit delay and a local receive delay is constant.

* * * * *